(12) United States Patent
Murray et al.

(10) Patent No.: US 8,520,929 B1
(45) Date of Patent: Aug. 27, 2013

(54) METHOD OF SENSING DEFECTS IN THE APPLICATION OF HOT MELT ADHESIVE

(75) Inventors: Brent A. Murray, Dothan, AL (US); William D. Knick, Jr., Dothan, AL (US)

(73) Assignee: Nypro Inc., Clinton, MA (US)

( * ) Notice: Subject to any disclaimer, the term of this patent is extended or adjusted under 35 U.S.C. 154(b) by 262 days.

(21) Appl. No.: 12/769,847

(22) Filed: Apr. 29, 2010

(51) Int. Cl.
*G06K 9/00* (2006.01)
*B29C 65/00* (2006.01)
*G01K 3/00* (2006.01)
*G06T 7/00* (2006.01)
*G01K 7/02* (2006.01)

(52) U.S. Cl.
CPC ............. *G06T 7/0004* (2013.01); *B29C 66/90* (2013.01); *G01K 7/021* (2013.01)
USPC ............................ 382/141; 156/64; 374/110

(58) Field of Classification Search
None
See application file for complete search history.

(56) References Cited

U.S. PATENT DOCUMENTS

| | | | | |
|---|---|---|---|---|
| 6,224,699 B1 * | 5/2001 | Bett et al. | ......................... | 156/64 |
| 7,150,559 B1 * | 12/2006 | Heerdt et al. | ................. | 374/110 |
| 7,434,986 B2 * | 10/2008 | Ignatowicz | ...................... | 374/4 |

\* cited by examiner

*Primary Examiner* — Ryan Zeender
*Assistant Examiner* — Denisse Ortiz Roman
(74) *Attorney, Agent, or Firm* — Mirick, O'Connell, DeMallie + Lougee, LLP

(57) ABSTRACT

A method of sensing defects in the application of hot melt adhesive to a structure. An infrared sensor is used to capture an infrared image of at least the location of the structure where the adhesive is supposed to have been applied. Different areas of the image are separately interrogated by reviewing each area to detect the presence or absence of adhesive. The interrogation is used to determine whether or not the application of the adhesive is of acceptable quality.

16 Claims, 5 Drawing Sheets

FIG. 2B

METHOD OF SENSING DEFECTS IN THE APPLICATION OF HOT MELT ADHESIVE

FIELD

This invention relates to infrared sensing of defects in the application of hot melt adhesive.

BACKGROUND

Hot melt adhesive can be difficult to automatically apply in a repeatable, uniform manner, particularly in an assembly line environment in which up to hundreds of parts per minute are being processed. Reasons for this difficulty include the viscous and highly adhesive nature of the adhesive. These qualities can cause inexact application of the adhesive and such defects as voids, air pockets, bridging, stringing and deposition in unwanted locations. These defects can lead to less than ideal or even rejectable parts. Further, since the adhesive is extremely sticky, excess adhesive and stringing of adhesive can result in the adhesive collecting on portions of the processing equipment that are meant to be adhesive-free. This can cause other production problems. Often times, production problems with the application of adhesive aren't discovered until many imperfect or rejectable parts have been processed, leading to relatively high scrap rates.

SUMMARY

In general, in one aspect the invention features a method of sensing defects in the application of hot melt adhesive to a structure. The method comprises using an infrared sensor to capture an infrared image of at least the location of the structure where the adhesive is supposed to have been applied, separately interrogating different areas of the image to detect the presence or absence of adhesive, and using the results of the interrogation to determine whether or not the application of the adhesive is of acceptable quality.

Various implementations of the invention may include one or more of the following features. The interrogation may comprise determining the approximate temperature at locations within the different areas that are interrogated. The temperatures and temperature ranges can be set by the user as desired. In one embodiment the approximate temperature may be from about 200° F. to about 250° F. The interrogation may comprise looking for voids in the adhesive. The interrogation may comprise looking for adhesive outside of the location where the adhesive is supposed to have been applied.

Various other implementations may include one or more of the following features. The adhesive is in one case supposed to have been applied as an annulus. In this case, at least some of the different areas of the image that are reviewed are supposed to include an arc-shaped bead of adhesive, and the method can include looking for an arc-shaped area of relatively high heat that is indicative of the presence of hot melt adhesive that has been applied but has not yet cooled to room temperature. The interrogation may further comprise looking for areas of relatively high heat outside of the arc-shaped area that are indicative of stray adhesive not confined to the annulus.

Various other implementations may include one or more of the following features. The method may further comprise automatically rejecting the structure if the adhesive application was not of acceptable quality. The interrogation may comprise looking for a defect among the group of defects consisting of adhesive voids, excess adhesive and adhesive stringing. The structure may comprise a plastic pour spout, the adhesive application accomplished automatically and sequentially on identical pour spouts using assembly line equipment comprising an adhesive applicator, the method further comprising automatically stopping use of the adhesive applicator once a predetermined quantity of unacceptable quality adhesive applications have been detected. A control system may be used to accomplish the interrogation and the determination of whether or not the adhesive application is of acceptable quality, and a data storage medium may be provided, the control system causing storage of images of unacceptable adhesive application in the data storage medium. A computer display may be provided, and the control system may cause images of structures to be displayed on the computer display. The control system may cause the number and types of faults detected to be stored in the data storage medium. The adhesive applicator may comprise bearings to support rotational motion of the structure and the captured image may include the bearings, in which case the control system may cause interrogation of the image to detect possible bearing failure as evidenced by unusual heat emanating from the bearings.

In general, in another aspect the invention features a method of sensing defects in the application of hot melt adhesive to a structure comprising using an infrared sensor to capture an infrared image of at least the location of the structure where the adhesive is supposed to have been applied, wherein the adhesive is supposed to have been applied as an annulus. Different areas of the image are separately reviewed to detect the presence or absence of adhesive. The review comprises determining a temperature between about 200° F. and about 250° F. at locations within the different areas that are reviewed. At least some of the different areas are supposed to include an arc-shaped bead of adhesive, and the review comprises looking for an arc-shaped area of relatively high heat that is indicative of the presence of hot melt adhesive that has been applied but has not yet cooled to room temperature. The results of the review are used to determine whether or not the application of the adhesive is of acceptable quality.

Various other implementations may include one or more of the following features. The review may comprise looking for a defect among the group of defects consisting of adhesive voids, excess adhesive and adhesive stringing. The structure may comprise a plastic pour spout, and the adhesive application may be accomplished automatically and sequentially on identical pour spouts using assembly line equipment comprising an adhesive applicator, and the method may further comprise automatically stopping use of the adhesive applicator once a predetermined quantity of unacceptable quality adhesive applications have been detected.

In general, in another aspect the invention features a method of sensing defects in the application of hot melt adhesive to a plastic pour spout, in which the adhesive application is accomplished automatically and sequentially on identical pour spouts using assembly line equipment comprising an adhesive applicator. The method comprises using an infrared sensor to capture an infrared image of at least the location of the pour spout where the adhesive is supposed to have been applied, wherein the adhesive is supposed to have been applied as an annulus, separately interrogating different areas of the image to detect the presence or absence of adhesive, wherein the interrogation comprises determining a temperature between about 200° F. and about 250° F. at locations within the different areas that are interrogated, wherein at least some of the different areas are supposed to include an arc-shaped bead of adhesive, and wherein the interrogation comprises looking for an arc-shaped area of relatively high heat that is indicative of the presence of hot melt adhesive that has been applied but has not yet cooled to room temperature. The method includes looking for a defect among the group of defects consisting of adhesive voids, excess adhesive, adhesive stringing and adhesive outside of the location where the adhesive is supposed to have been applied, and using the results of the interrogation to determine whether or not the application of the adhesive is of acceptable quality. The method further includes automatically rejecting the spout if the adhesive application was not of acceptable quality, and automatically stopping use of the adhesive applicator once a predetermined quantity of unacceptable quality adhesive applications have been detected. The current image is displayed on a computer display. Images of and the quantity of unacceptable adhesive applications, as well as the types of faults detected, are stored in a computer memory.

DETAILED DESCRIPTION

This invention may be accomplished in a method of sensing defects in the application of hot melt adhesive to a structure. An infrared sensor is used to capture an infrared image of at least the location of the structure where the adhesive is supposed to have been applied. Different areas of the image are separately interrogated by reviewing each area to detect the presence or absence of adhesive. The interrogation is used to determine whether or not the application of the adhesive is of acceptable quality.

Figure 1:
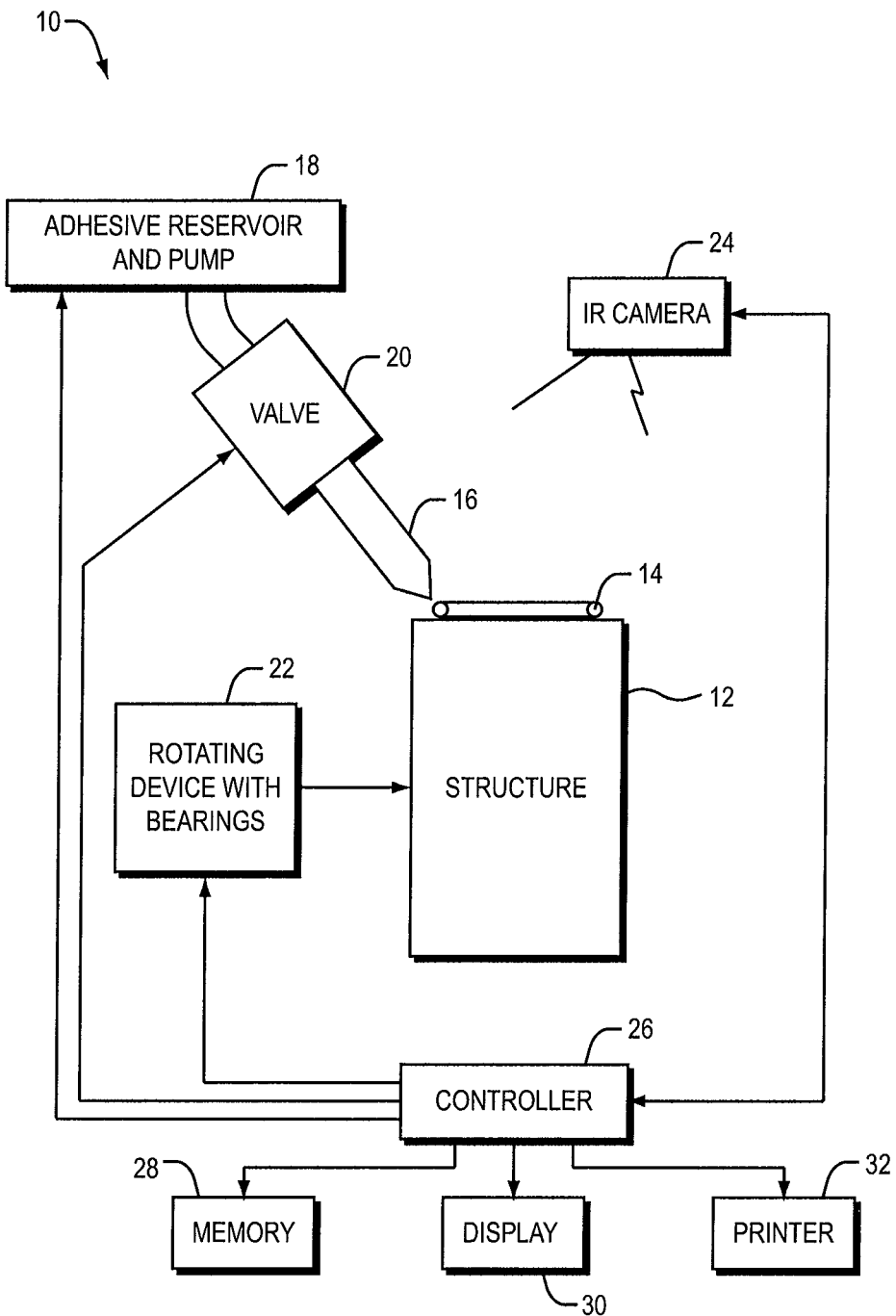
FIG. 1 is a schematic block diagram of a hot melt adhesive application and defect detection system that can be used in the invention.

FIG. 1 shows hot melt adhesive application defect detection system 10. System 10 is installed in an assembly line environment in which many parts or structures 12 have hot melt adhesive automatically applied to them. In this example, the adhesive is applied as an annulus 14. However, neither the manner of application nor the resulting shape, locations or other aspects of the applied hot melt adhesive are limitations of the invention, as the invention accomplishes sensing of defects in applied hot melt adhesive irrespective of the location or locations or amounts of the adhesive applied.

Adhesive is supplied by adhesive reservoir and pump 18, and applied through nozzle 16 as controlled by valve 20, which is typically a solenoid-controlled needle valve.

In this instance, structure 12 is rotated relative to nozzle 16 by rotating device 22. Device 22 has one or more sets of bearings to facilitate the rotational motion that is applied to structure 12. This arrangement allows a single nozzle to be used to apply an annulus of adhesive as the structure is spun beneath the nozzle. Rotation of structure 12 is not a requirement of the invention. The adhesive could be applied in one location, or other motions of the structure relative to the adhesive applicator could be accomplished. For example, a linear bead of adhesive could be applied by moving structure 12 in a linear manner relative to nozzle 16. Alternatively, nozzle 16 could be moved relative to structure 12. Also, more than one nozzle can be used to apply adhesive either simultaneously or sequentially in different locations on structure 12.

Infrared camera 24 is used to capture one or more images of the adhesive after it is applied to structure 12, or more specifically, to capture the area or areas of structure 12 that should have had adhesive applied thereto, along with areas of concern (of structure 12, and potentially of production equipment that handles structure 12) where stray unwanted adhesive may have inadvertently been applied. Infrared camera 24 may be a model A325 camera available from FLIR Systems, Inc. of Wilsonville, Oreg. Controller 26, which may be implemented, for example, as a programmed desktop or laptop computer, is used to control camera 24 and also receives images from the camera 24. This same controller, or perhaps other controllers, can be used to control device 22, valve 20, and the pump associated with reservoir 18. The invention herein focuses on infrared image capture and analysis, so these other aspects of adhesive application that may be controlled are not further detailed herein. Associated with controller 26 is computer memory 28. Visual display 30 and/or printer 32 may be provided. When provided, display 30 is typically located in the production environment close to the location at which the adhesive is applied so that an operator can obtain a more detailed view of the adhesive application results. Printer 32 may be located more remotely for use to print error reports and the like.

Figure 2A:
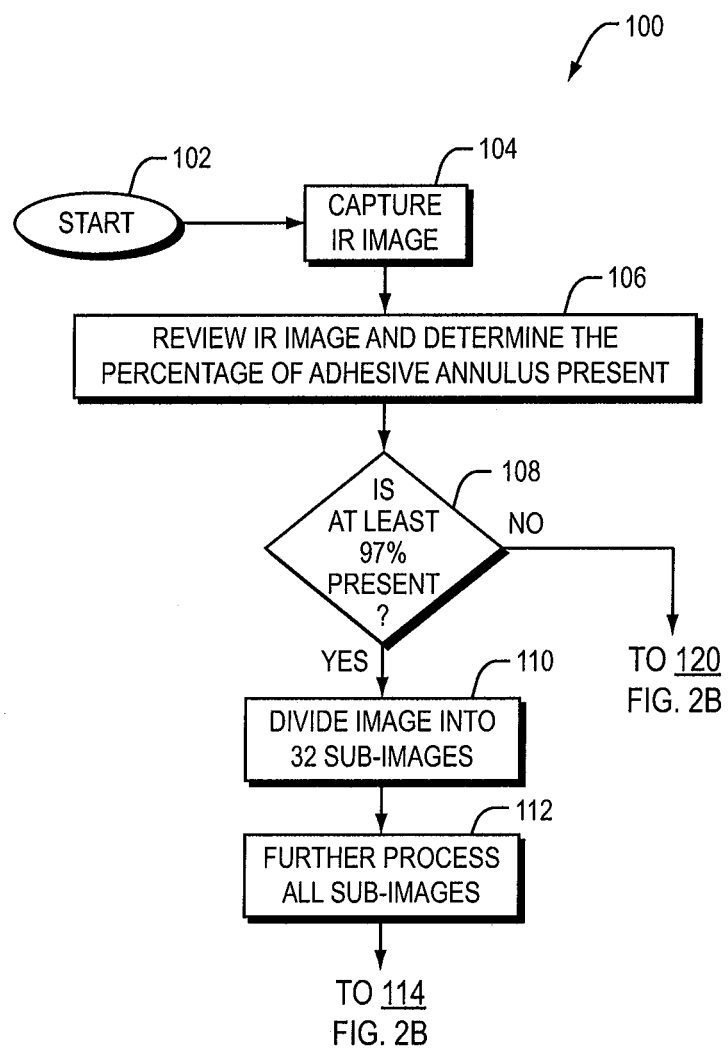
FIGS. 2A and 2B are a flow chart of an embodiment of a method of the invention.
Figure 2B:
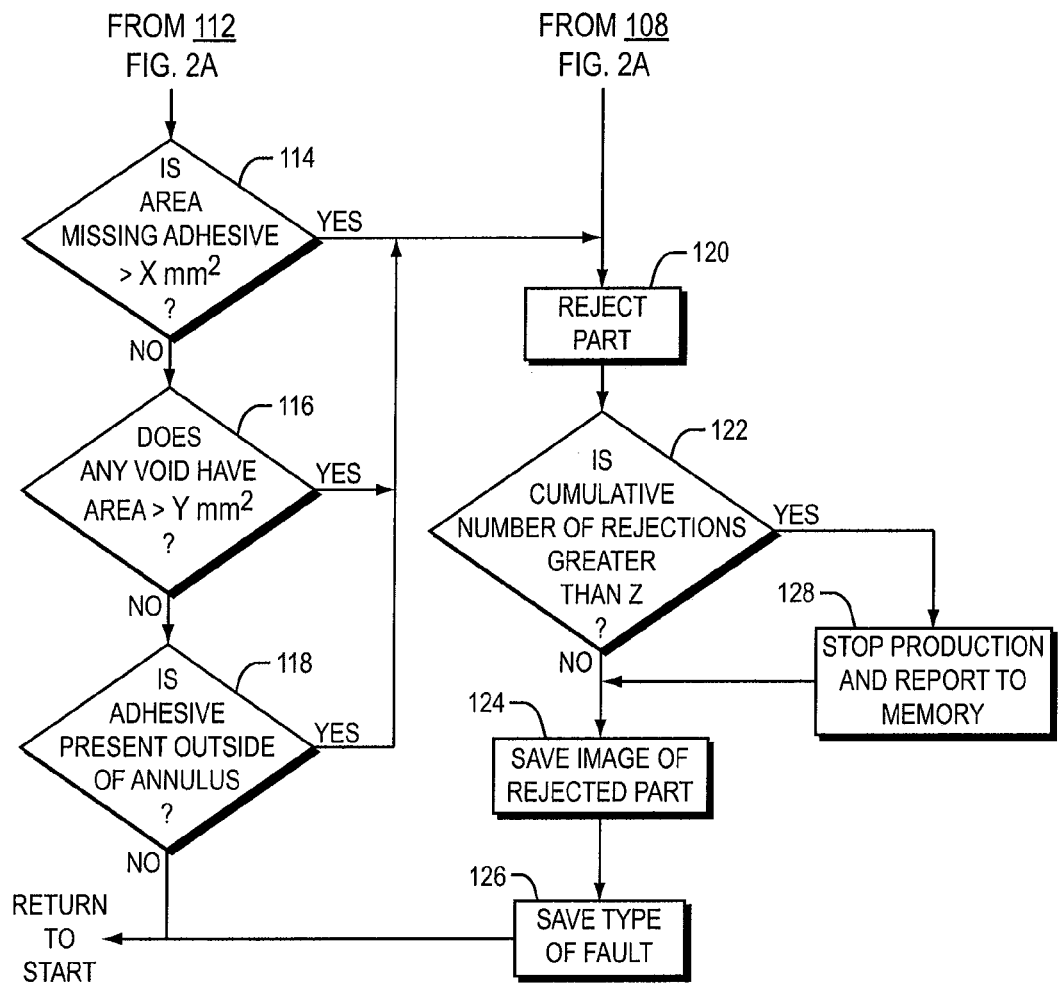

A flow chart detailing certain aspects of an embodiment of the method is shown in FIGS. 2A and 2B. Method 100 relates to image processing and resulting actions. Method 100 begins with start step 102. At step 104, the IR image of the part to which adhesive was just applied is captured. In an assembly line environment in which an annulus of adhesive is being applied, after the adhesive application the rotation of structure 12 caused by device 22 stops and an image of the portion of structure 12 that should be carrying the adhesive is captured by camera 24. At step 106, the captured image is automatically reviewed by software carried by or accessible to controller 26 and the percentage of the annulus of adhesive actually present in the image (as compared to a full annulus that should be present) is determined. In one non-limiting embodiment if at least ninety-seven percent (97%) of the adhesive that should have been applied is detected as being present in the annulus, step 108, the inspection process continues. If this is not the case, the part is rejected, step 120, and operation proceeds as will be described in more detail below. Step 108 thus is a first pass that determines whether the gross amount of adhesive present in the image is potentially sufficient to comprise an acceptable adhesive application. The percentage deemed acceptable can be set by the user as desired or required for a particular application.

Adhesive is detected by camera 24 based on the fact that the adhesive is applied at a high temperature. In one example, the hot melt adhesive is at a temperature of about 400° F. when it is applied. In an infrared image captured a short time after the adhesive application is complete, it has been determined that the adhesive should be at a temperature in the range of from about 200° F. to about 250° F. In this case, then, controller 26 is programmed to detect the presence of adhesive in any pixel of the image when the temperature at that pixel is between 200-250° F. If the temperature is less than 200° F., the pixel is reported as not including adhesive. These temperature set points and ranges can be established as desired by the user, and can be changed.

Figure 3:
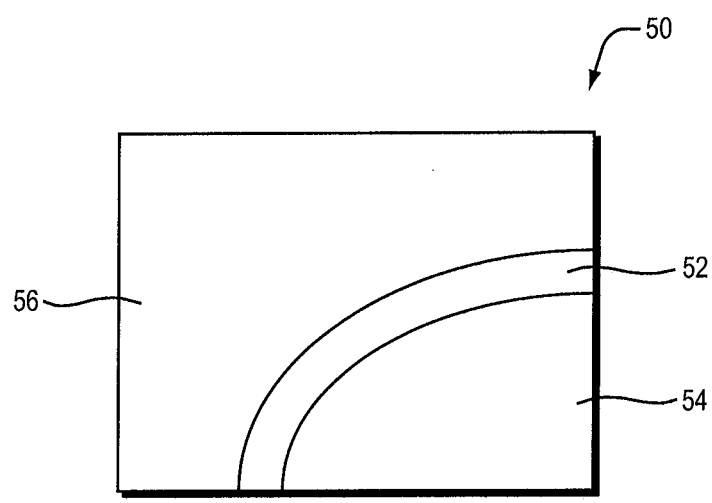
FIG. 3 shows an area of an image captured by the infrared camera of Figure 1.

In order to increase the resolution of the temperature-based adhesive detection, in this embodiment the captured image is effectively divided into thirty-two sub-images that together include all of the area of interest. A schematic representation of one such sub-image is shown in FIG. 3. This image division is not required in the invention, and division into thirty-two portions is also not required. In this case where the image is divided, ultimately if the results are unacceptable in any one of the thirty-two sub-images, the part is rejected. This will be further explained below. At step 112, the sub-images are all processed together (in sequence) so that the inspection and decision to reject or accept the part can be made in about 0.2 seconds.

The processing of each of the sub-images to determine whether the adhesive application results within that sub-image are acceptable is explained with reference to steps 114, 116 and 118. The steps need not be accomplished sequentially or separately. Rather, this is but one means of applying the adhesive acceptance/rejection criteria in one specific embodiment of the invention. These steps can also be used to detect other problems or potential problems with the adhesive application. Any such problems are detected and reported, as further described below.

At step 114, if the total area (in all the sub-images put together) that should have adhesive but is missing adhesive, is at least X mm$^2$ in area, the part is rejected. The determination in step 114 can be made in each sub-image, and also in the totality of all the sub-images put together, in other words in the whole of the originally captured image. Thus, for example, if a total void area of at least 3 mm$^2$ is determined to be a problem, this limit can be set for a determination of a single void of at least 3 mm$^2$ and/or more than one smaller void that together total at least 3 mm$^2$ in area. This limit can be set as desired and changed as desired depending upon the particular part or parts to which the adhesive is being applied, and the problem or problems associated with a single void or multiple voids, depending on the application and the requirements of the customer. At step 116, if any single void has an area of at least Y mm$^2$, the part is rejected. Also, a void length can be separately set as a rejection criterion. For example, a void having a length of at least 2 mm along the longitudinal axis of the adhesive beard can cause part rejection.

At step 118, the sub-images are reviewed to detect whether adhesive is present outside of the expected area, which in this case is an annulus. With reference to FIG. 3, sub-image 50 comprises arc 52 (which is a portion of the annulus where adhesive should be located), area 54 inside of arc 52, and area 56 outside of arc 52. The width of the arc that should be present is known. Heat over 150° F. (or other temperature as defined by the user) outside of arc-shaped area 52, whether in inner area 54 or outer area 56, indicates the presence of unwanted adhesive which can lead to a rejection. In the case presented in FIGS. 2A and 2B, the detection of any adhesive outside of the annulus causes a rejection of the part. However, as with the other criteria on which acceptance or rejection are based, the limits can be changed. For example, a certain total area and/or area of any contiguous portion of adhesive outside of the expected annulus can be set as one or multiple limits of acceptance/rejection.

Figure 4:
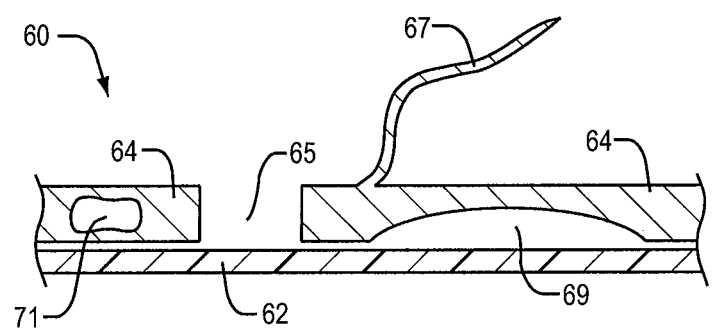
FIG. 4 is an enlarged partial cross-sectional view illustrating several types of defects that can be sensed according to the invention.

Examples of certain defects in the application of a bead of hot melt adhesive are shown in FIG. 4. Drawing 60 comprises a surface 62 of a part to which bead 64 of hot melt adhesive has been applied. Void 65 is a length of this bead that does not include adhesive (or perhaps does not include sufficient adhesive to maintain a temperature of at least 200° F. at the time of image capture). Bridged area 69 is a portion at which thin adhesive bead 64 is not in contact with underlying surface 62. Adhesive string 67 is a thin volume of adhesive that strays in any direction from annular bead 64. Stringing can also cause other equipment problems, as the strings can adhere to production equipment that is not meant to carry adhesive (e.g., part handling equipment). This can make the equipment sticky and lead to mishandling of parts. Accordingly, detecting stringing (or detecting stray adhesive on parts of the equipment where it should not be) can indicate the need for preventive maintenance before other production problems arise.

Air bubble 71 can be located fully within the interior of bead 64 as shown or, if exposed to the top of the bead, results in a depression or thin area of application which is essentially the reverse of bridge 69. A void 71 located at surface 62 can be present across part of perhaps all of the width of bead 64. If present across all of the width, such a void or surface depression can be considered to be effectively the same as a bridge.

Bridges and voids can potentially be found with a more nuanced or subtle view of the temperature profile detected in the infrared image. For example, the presence of a bead or other area of adhesive with the full expected volume of adhesive present may present one temperature range, for example, 240-250° F. As stated previously, a temperature below 200° F. is considered a void. In this case, temperatures of greater than 200° F. and less than 240° F. can potentially be considered to indicate the presence of adhesive, but in insufficient quantities to be considered a full expected volume in the location covered by that pixel of the image. Such temperatures could be indicative of bridging or bubbles, for example. Stringing and other applications of adhesive outside of the volume where the adhesive should have been applied can typically be detected looking at the full range of expected adhesive temperatures of 200-250° F., but other ranges or more narrow ranges can also be set. The temperatures and temperature ranges are typically determined experimentally in advance of a production run. The temperatures and temperature ranges disclosed in the embodiments are not limitations of the invention, as they can be set as desired by the user and in part depend on the temperature of the adhesive when it was applied and the time lapse between its application and IR image capture.

If any of the criteria established for rejection of the adhesive application are encountered, the part is rejected, step 120. In one embodiment, controller 26 keeps track of the cumulative number of rejections. Also, in one embodiment if there are Z consecutive faults production is stopped and the rejections and the resulting actions are reported to memory 28, step 128 and potentially printed by printer 32. The production stop can be accomplished by controller 26 alone, or by communication between controller 26 and another controller that more directly controls the assembly line. In each case, the image captured at step 104 of each rejected part is saved, step 124, and the type of fault is saved in a table or other database, step 126. Any of the saved information can also be printed, in any desired format (e.g., a report that is then associated and thus a record of a particular production run). Display 30 preferably displays the infrared image of the current part.

One specific embodiment accomplishes the review of the application of an annulus of hot melt adhesive to a well on the underside of a plastic pour spout or "transition" for a plastic container for liquid (e.g., a liquid detergent container). In this case, the annulus of hot melt adhesive ends up acting as a gasket for the sealing of the spout to the container when the spout is snap-fitted into an opening in the container body.

Figure 5:
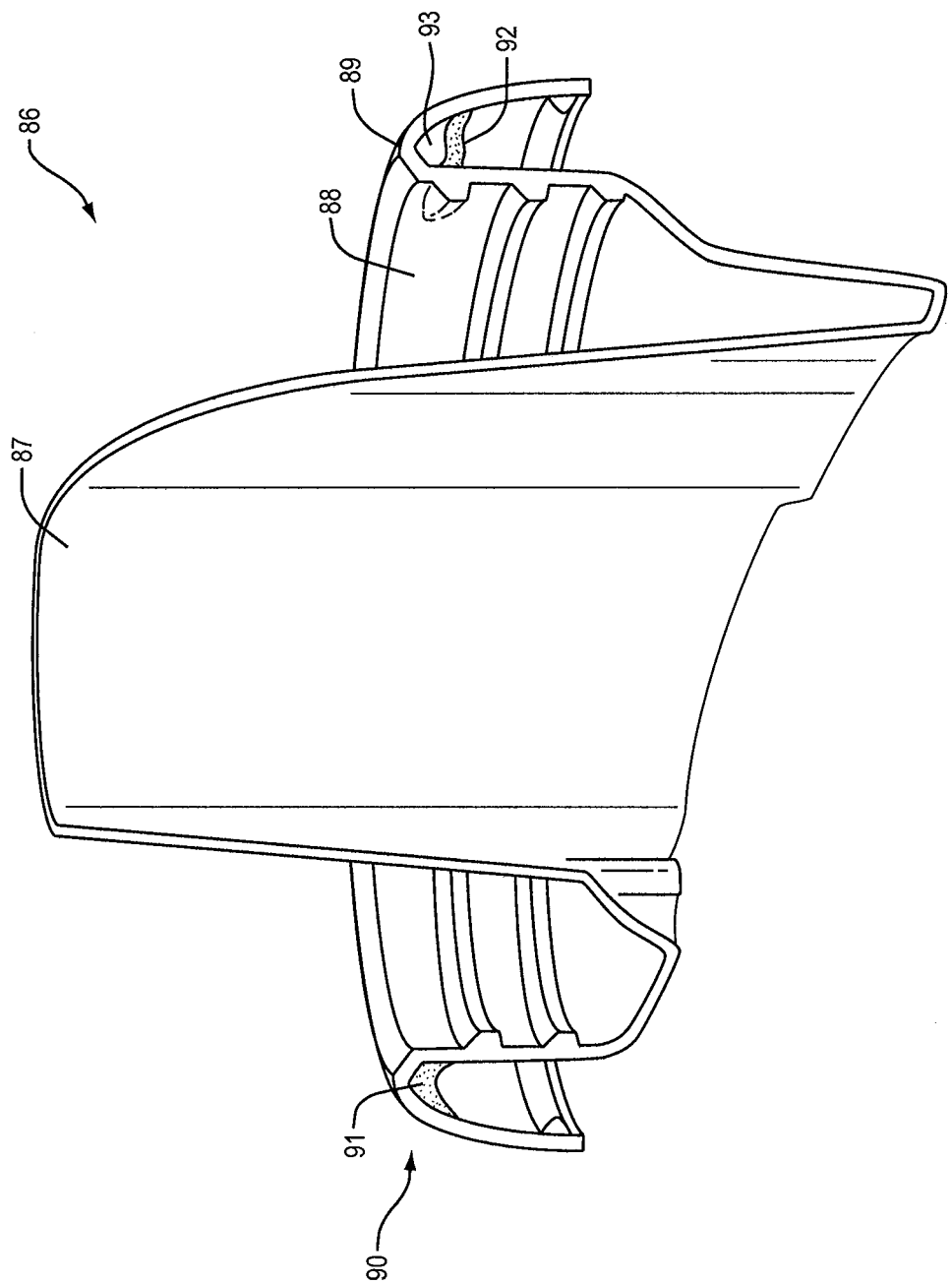
FIG. 5 is an enlarged cross-sectional view of a pour spout with hot melt adhesive applied thereto.

FIG. 5 is a cross-section of an injection molded plastic pour spout or transition 86 that is designed to be snap-fitted onto a plastic container (not shown) that is designed to hold liquid laundry detergent. Transition 86 defines pour spout 87. Skirt 90 defines surface 88 that carries threads to which a threaded cap (not shown) will be engaged. Shoulder 89 of skirt 90 ends up resting against or in close proximity to the rim of the opening of the container. Shoulder 89 thus needs to form a liquid-tight seal to the container. Hot melt adhesive is used to create a "gasket" that accomplishes this seal. The adhesive is applied after the spout is molded. Adhesive in location 91 is a good quality void-free application, while area 92 is not touching underlying surface 93 and so is considered to be a bridge that may be considered a defect.

When spout 86 with adhesive having already been applied is ready to be fitted to the container, the spout is heated so as to soften the adhesive. Then the spout is fitted onto the container while the adhesive is still soft. This allows the adhesive to form fit to the container top and act as a gasket when it hardens. If the bead of adhesive has gaps or other defects the bead may not form a liquid-tight seal. Accordingly, it is important to inspect the bead to make sure it is of sufficient quality. This inspection is accomplished by the invention. The invention is not limited to the use of hot melt adhesive in this manner, as the structure to which the hot melt adhesive is applied, and the use of the structure and the adhesive are not limitations of the invention.

Another manner in which the invention can be used is to catch possible impending problems with the bearings of the device 22 that is used to rotate structure 12 as the adhesive is applied. Camera 24 can be set up so that the location(s) of these bearings are within the camera's field of view. Bearings tend to start to heat up as they near failure due to increased friction. Accordingly, if a bearing in the field of view becomes hot, its location will show an above-ambient temperature in the infrared image. The operator will see this on display 30 and can take appropriate preventive maintenance. Of course the unusual heat can also be detected automatically using the inventive method, by setting a desired temperature range indicative of a hot bearing and/or by interrogating areas of the image that include a bearing. Also, stray adhesive on areas of production equipment that are within the field of view of the infrared camera can be detected automatically or manually (using the display), thus presenting information that can be used to accomplish preventive maintenance.

Other implementations are within the scope of the following claims.

What is claimed is:

1. A method of sensing defects in the application of hot melt adhesive to a structure, comprising:
    using an infrared sensor to capture an infrared image of at least the location of the structure where an annular ring of the adhesive is supposed to have been applied;
    separately interrogating different areas of the image to detect the presence or absence of adhesive, wherein the interrogation comprises detecting a temperature within a preset annular boundary associated with the annular ring of adhesive and detecting a temperature outside of the preset annular boundary associated with the annular ring of adhesive; and
    using the results of the interrogation to determine whether or not the application of the adhesive is of acceptable quality, at least by:
    i) establishing the preset annular boundary as an area of the structure that is supposed to be covered by the adhesive;
    ii) establishing a minimum amount of the area of the structure that is supposed to be covered by the adhesive that must be covered by adhesive for the structure to be acceptable;
    iii) determining from the interrogation whether adhesive is present in at least the established minimum amount of the area of the structure that is supposed to be covered by the adhesive;
    iv) detecting when the temperature outside of the preset annular boundary associated with the annular ring of adhesive is greater than a preset threshold;
    v) rejecting the structure if adhesive is not present in at least the established minimum amount of the area of the structure that is supposed to be covered by the adhesive; and
    vi) rejecting the structure when the adhesive is present outside of the preset annular boundary in response to detecting of the temperature outside of the preset annular boundary associated with the annular ring of adhesive being greater than the preset threshold.

2. The method of claim 1 wherein the interrogation comprises determining the approximate temperature at locations within the different areas that are interrogated.

3. The method of claim 2 wherein the approximate temperature is from about 200° F. to about 250° F.

4. The method of claim 1 wherein the interrogation comprises looking for voids in the adhesive.

5. The method of claim 1 wherein the interrogation comprises looking for adhesive outside of the location where the adhesive is supposed to have been applied.

6. The method of claim 1 further comprising automatically rejecting the structure if the adhesive application was not of acceptable quality.

7. The method of claim 1 wherein the interrogation comprises looking for a defect among the group of defects consisting of adhesive voids, excess adhesive and adhesive stringing.

8. The method of claim 1 wherein the structure comprises a plastic pour spout, and the adhesive application is accomplished automatically and sequentially on identical pour spouts using assembly line equipment comprising an adhesive applicator, the method further comprising automatically stopping use of the adhesive applicator once a predetermined quantity of unacceptable quality adhesive applications have been detected.

9. The method of claim 8 wherein a control system is used to accomplish the interrogation and the determination of whether or not the adhesive application is of acceptable quality, and wherein a data storage medium is provided, wherein the control system causes storage of images of unacceptable adhesive application in the data storage medium.

10. The method of claim 9 wherein a computer display is provided, and the control system causes images of pour spouts to be displayed on the computer display in real time.

11. The method of claim 9 wherein the control system causes the number and types of faults detected to be stored in the data storage medium.

12. The method of claim 9 wherein the adhesive applicator comprises bearings to support rotational motion of the structure, and the captured image includes the bearings, and the control system causes interrogation of the image to detect possible bearing failure as evidenced by unusual heat emanating from the bearings.

13. A method of sensing defects in the application of hot melt adhesive to a structure, comprising:
    using an infrared sensor to capture an infrared image of at least the location of the structure where an annular ring of the adhesive is supposed to have been applied;
    separately interrogating different areas of the image to detect the presence or absence of adhesive, wherein the interrogation comprises detecting a temperature between about 200° F. and about 250° F. at locations within the different areas that are interrogated and within a preset annular boundary associated with the annular ring of adhesive detecting an arc-shaped area of relatively high heat that is indicative of the presence of hot melt adhesive that has been applied but has not yet cooled to room temperature, and detecting a temperature outside of the preset annular boundary associated with the annular ring of adhesive; and using the results of the interrogation to determine whether or not the application of the adhesive is of acceptable quality, at least by:

i) establishing the preset annular boundary as an area of the structure that is supposed to be covered by the adhesive;

ii) establishing a minimum amount of the area of the structure that is supposed to be covered by the adhesive that must be covered by adhesive for the structure to be acceptable;

iii) determining from the interrogation whether adhesive is present in at least the established minimum amount of the area of the structure that is supposed to be covered by the adhesive;

iv) detecting when the temperature outside of the preset annular boundary associated with the annular ring of adhesive is greater than a preset threshold;

v) rejecting the structure if adhesive is not present in at least the established minimum amount of the area of the structure that is supposed to be covered by the adhesive; and vi) rejecting the structure when the adhesive is present outside of the preset annular boundary in response to detecting of the temperature outside of the preset annular boundary associated with the annular ring of adhesive being greater than the preset threshold.

14. The method of claim 13 wherein the interrogation comprises looking for a defect among the group of defects consisting of adhesive voids, excess adhesive and adhesive stringing.

15. The method of claim 14 wherein the structure comprises a plastic pour spout, and the adhesive application is accomplished automatically and sequentially on identical pour spouts using assembly line equipment comprising an adhesive applicator, the method further comprising automatically stopping use of the adhesive applicator once a predetermined quantity of unacceptable quality adhesive applications have been detected.

16. A method of sensing defects in the application of hot melt adhesive to a plastic pour spout, where the adhesive application is accomplished automatically and sequentially on identical spouts using assembly line equipment comprising an adhesive applicator, the method comprising:

using an infrared sensor to capture an infrared image of at least the location of the pour spout where an annular ring of the adhesive is supposed to have been applied;

separately interrogating different areas of the image to detect the presence or absence of adhesive, wherein the interrogation comprises detecting a temperature between about 200° F. and about 250° F. at locations within the different areas that are interrogated and within a preset annular boundary associated with the annular ring of adhesive, detecting an arc-shaped area of relatively high heat that is indicative of the presence of hot melt adhesive that has been applied but has not yet cooled to room temperature, detecting a temperature outside of the preset annular boundary associated with the annular ring of adhesive, and detecting a defect among the group of defects consisting of adhesive voids, excess adhesive, adhesive stringing and adhesive outside of the location where the adhesive is supposed to have been applied;

using the results of the interrogation to determine whether or not the application of the adhesive is of acceptable quality, at least by:

i) establishing the preset annular boundary as an area of the spout that is supposed to be covered by the adhesive;

ii) establishing a minimum amount of the area of the spout that is supposed to be covered by the adhesive that must be covered by adhesive for the spout to be acceptable;

iii) determining from the interrogation whether adhesive is present in at least the established minimum amount of the area of the spout that is supposed to be covered by the adhesive;

iv) detecting when the temperature outside of the preset annular boundary associated with the annular ring of adhesive is greater than a preset threshold;

v) rejecting the spout if adhesive is not present in at least the established minimum amount of the area of the spout that is supposed to be covered by the adhesive;

vi) rejecting the spout when the adhesive is present outside of the preset annular boundary in response to detecting of the temperature outside of the preset annular boundary associated with the annular ring of adhesive being greater than the preset threshold;

automatically rejecting the spout if the adhesive application was not of acceptable quality, and automatically stopping use of the adhesive applicator once a predetermined quantity of unacceptable quality adhesive applications have been detected;

providing a computer display on which the current image is displayed; and providing a computer memory, and storing images of and the quantity of unacceptable adhesive applications, as well as the types of faults detected, in the computer memory.

* * * * *